Figure 4:
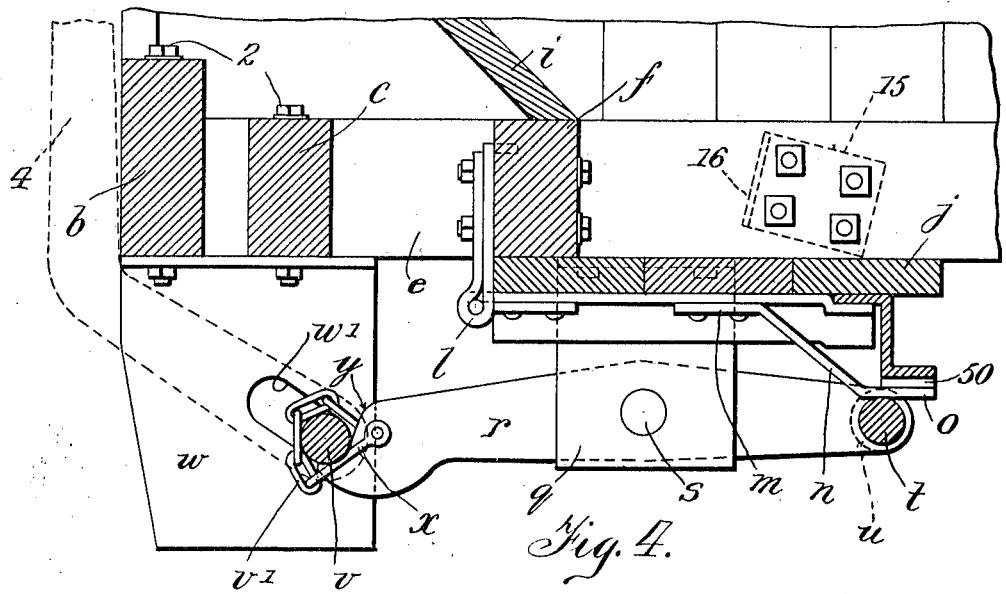

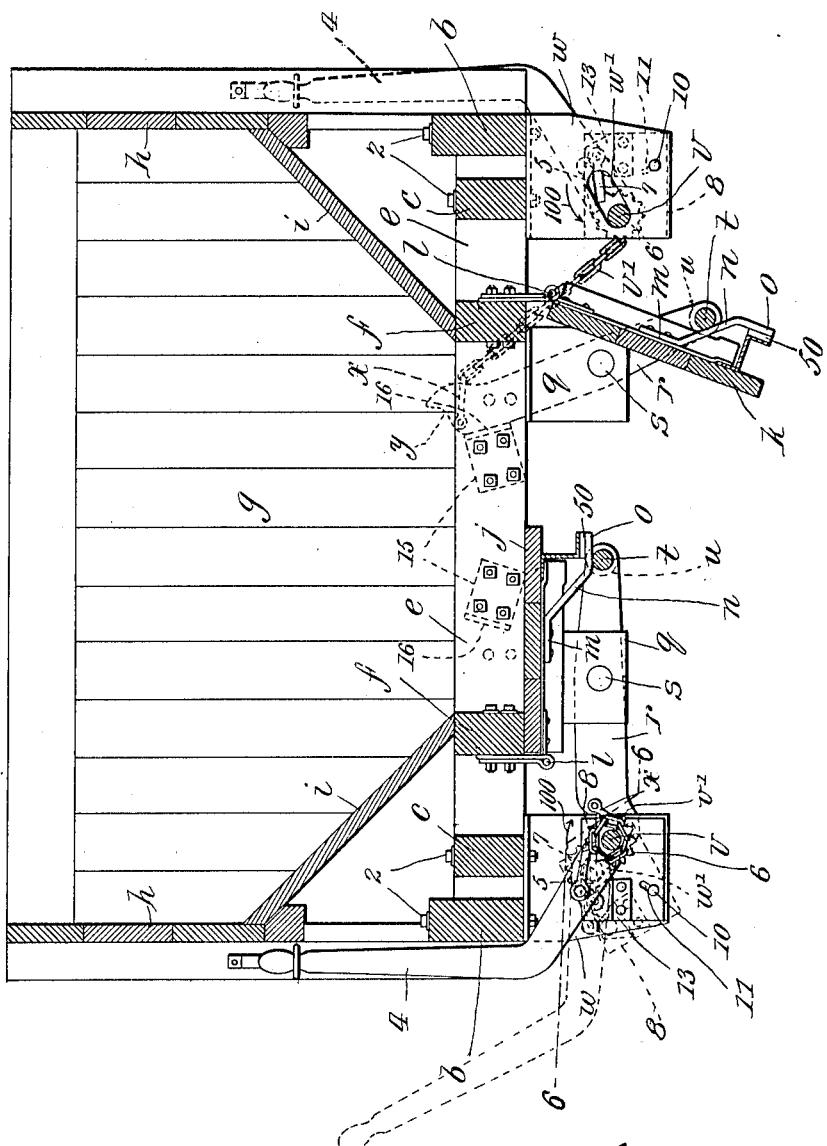

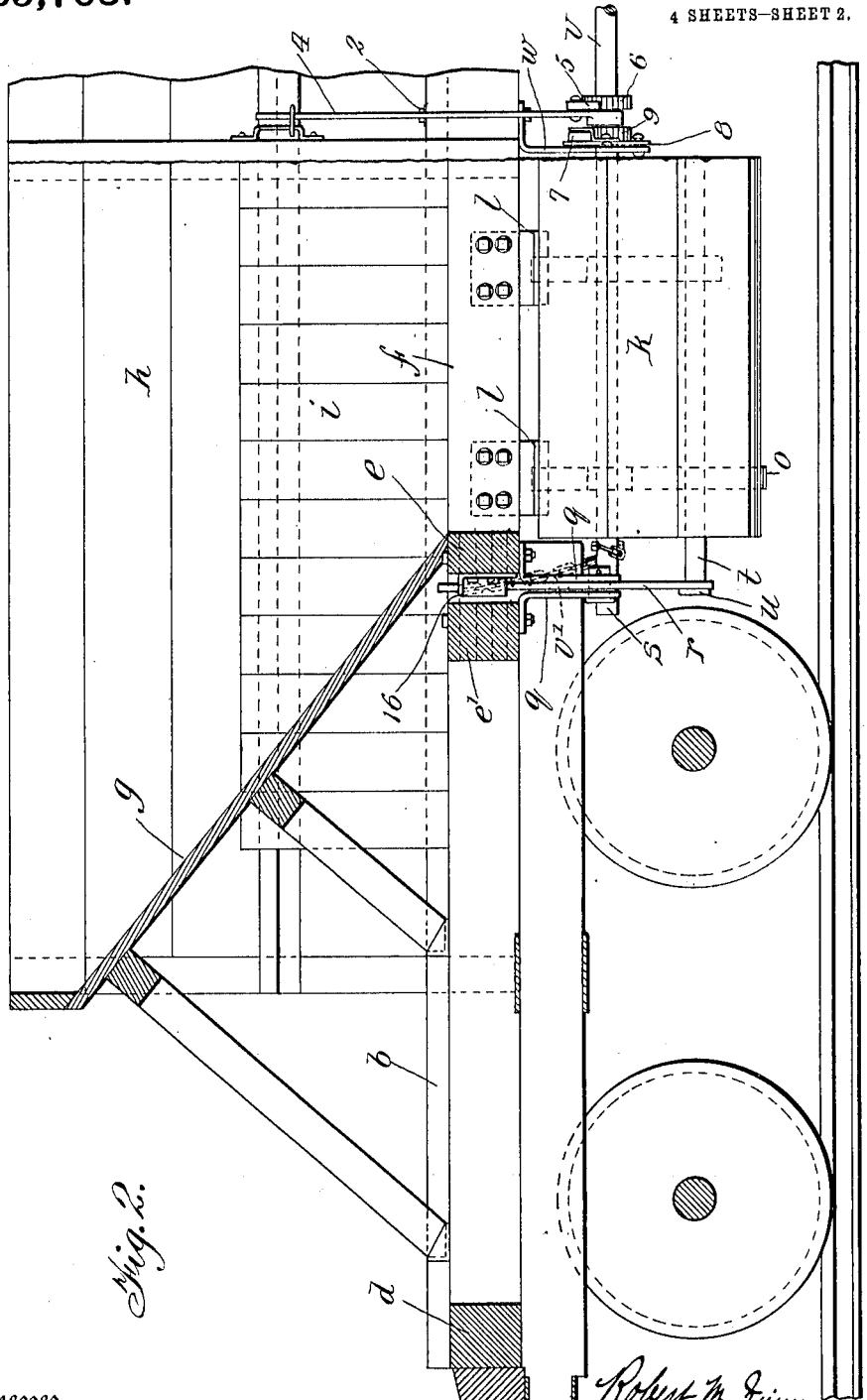

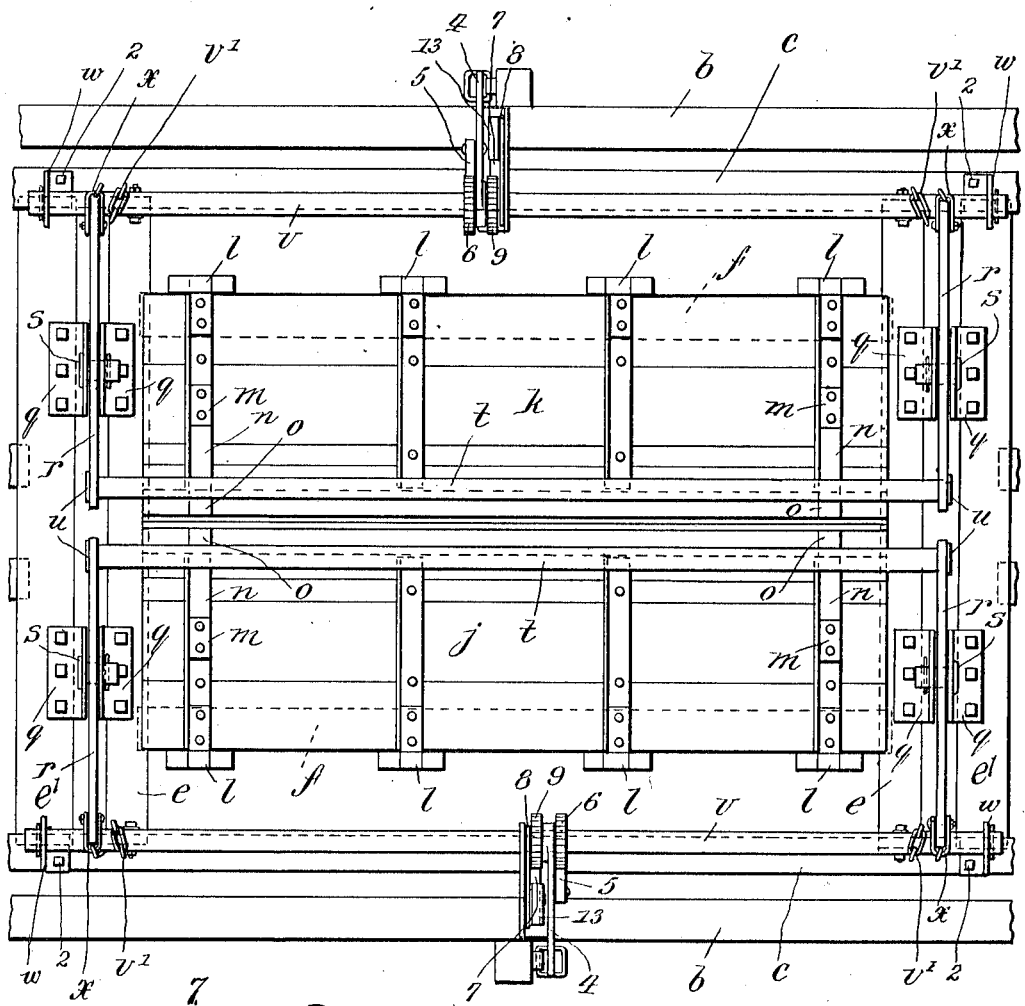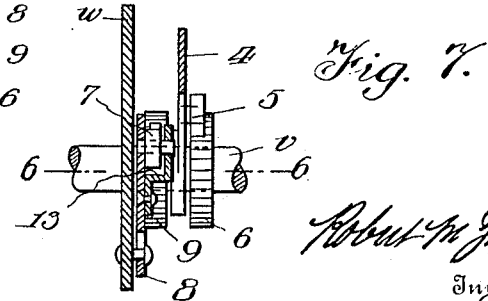

R. M. ZIMMERMAN.
DUMP CAR.
APPLICATION FILED JULY 30, 1910.

1,035,763.

Patented Aug. 13, 1912.
4 SHEETS—SHEET 4.

Witnesses

Robert M. Zimmerman
Inventor
By Attorney

UNITED STATES PATENT OFFICE.

ROBERT MONTAGUE ZIMMERMAN, OF MONTREAL, QUEBEC, CANADA, ASSIGNOR TO NATIONAL DUMP CAR COMPANY, OF CHICAGO, ILLINOIS, A CORPORATION OF MAINE.

DUMP-CAR.

1,035,763.  Specification of Letters Patent.  Patented Aug. 13, 1912.

Application filed July 30, 1910. Serial No. 574,682.

*To all whom it may concern:*

Be it known that I, ROBERT MONTAGUE ZIMMERMAN, of the city of Montreal, Province of Quebec, Canada, have invented certain new and useful Improvements in Dump-Cars; and I do hereby declare that the following is a full, clear, and exact description of the same.

The object of my invention is to provide a simple and durable lever mechanism for operating the doors of dump cars.

For full comprehension, however, of my invention reference must be had to the accompanying drawings forming a part of this specification, in which similar reference characters indicate the same parts and wherein—

Figure 5:
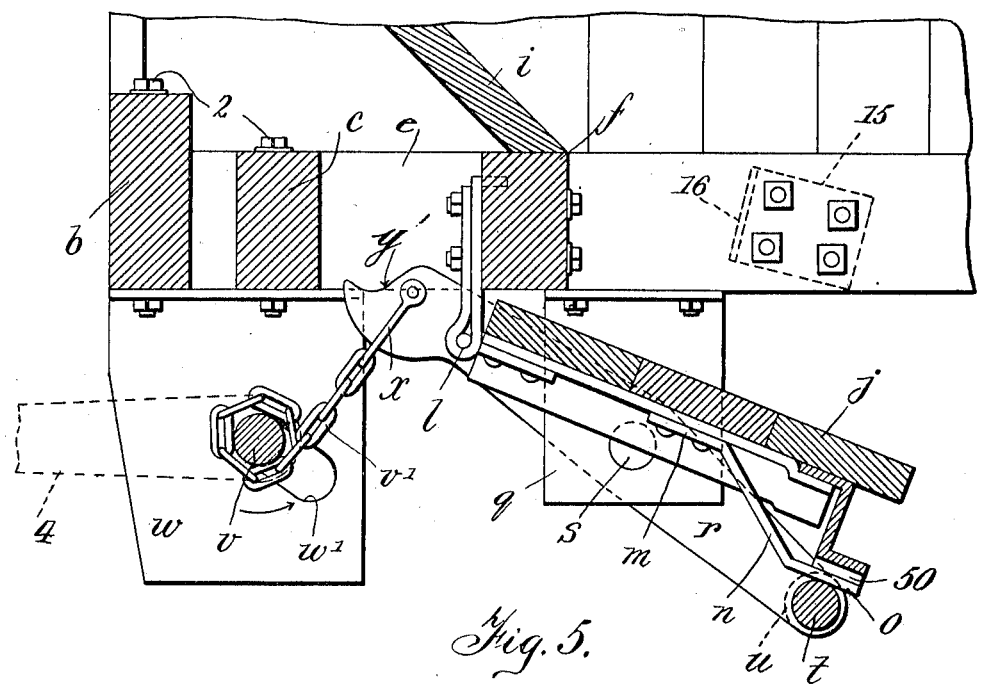

Figure 1 is a transverse sectional view of a car constructed according to my invention; Fig. 2 is a part side elevation and part longitudinal section of one end thereof; Fig. 3 is a bottom plan of the middle portion of the car; Fig. 4 is an enlarged transverse sectional view showing particularly one of the doors locked in its closed position; and Fig. 5 is a similar view to Fig. 4 showing the door partly open. Fig. 6 is a detail horizontal section taken on line 6—6 Figs. 1 and 7 and illustrating particularly the means for rotating and locking the main operating shaft, the shaft, the pawls and ratchet wheels being in elevation. Fig. 7 is a detail vertical section taken on line 7—7 Fig. 6.

The body of the car comprises a floor frame consisting of a pair of side sills $b$, longitudinal intermediate sills $c$, end sills $d$, intermediate transverse sills $e$ and $e'$ and auxiliary longitudinal timbers $f$, the latter extending between the transverse sills $e$. The superstructure carried by this floor frame comprises inclined end hopper walls $g$ and side walls consisting of vertical and inclined portions $h$ and $i$ respectively, the transverse sills $e$ and auxiliary longitudinal timbers $f$ having the hopper walls fastened thereto and forming the frame of the discharge opening of the car. The doors $j$ and $k$ are hinged as at $l$ to the sills $f$ forming the opposite sides of the discharge opening, each door closing one half of the opening and having secured to the underside thereof, near the front edge, transverse rails $m$ presenting a sharply inclined tread portion $n$ extending from the underside of the doors toward the front edge thereof and terminating in a portion $o$ approximately parallel to the door, these rails are supported at their outer ends upon Z-bars secured to the underside of the doors, while distance pieces 50 are situated between the rails and the Z-bars.

The mechanism for operating the door is supported in brackets $q$ situated at the opposite ends of the door opening. Two pairs of transverse levers $r$ disposed below the level of the door frame are fulcrumed as at $s$ to the brackets, and between their ends and nearer their working ends than their power ends, the working ends of each pair extending to within a short distance of the center of the car and each pair carrying a door supporting shaft $t$, such shafts being adapted to act upon the rails $n$ and $o$ and having collars $u$ on their ends preventing longitudinal displacement of the shafts, the said portions $n$ of the rails $m$ being inclined approximately at an angle of 45° to the doors. The power ends of the levers are connected by chains $v'$ to operating shafts $v$ supported in cam slots $w'$ in bearings $w$ secured by bolts 2 to the lower edge of the side sills $b$ and the longitudinal timbers $c$, the chains being attached to the levers by clevises $x$.

The extreme outer ends of the levers are recessed as at $y$ and the shafts $v$ are adapted to engage these recessed ends when the levers swing the doors to closed position for the purpose of locking the doors in such position as illustrated particularly in Fig. 4, the slots being inclined upwardly toward the sides of the car so that their upper walls present cam faces which act to move the shafts $v$ outwardly to a position beyond the arcs described by the levers so as to allow the latter to clear the shafts in their movement as will be presently pointed out.

Diagonal plates 15 are secured to the outer faces of the transverse sills $e$ and present outwardly extending flanges 16 limiting the movement of the levers, to support the doors in proper discharging position, such plates also relieving the operating shaft $v$ of the weight of the doors when in such position by placing the chains $v'$ out of tension.

The shafts are operated by means of levers 4 on such shafts at points substantially midway between the ends of the latter and carrying pawls 5 engaging ratchet wheels 6 mounted rigidly upon the shafts while detent pawls 7 carried by floating plates 8 engage additional ratchet wheels 9 on the shafts. The purpose of the floating plates is to maintain the operative relation of the detent pawls and ratchet wheels, and they are loosely mounted upon the operating shafts and movably connected to the brackets $w$ by studs 10 secured to the latter and which work in slots 11 formed in the plates 8 this movable connection allowing of movement of the detent pawls necessary to maintain operative engagement with the ratchet wheels 9 during the movement of the operating shafts in the cam slots 2' as shown in dotted lines at the left of Fig. 1; the brackets 13 for supporting the detent pawls 7 are fastened to the plates 8.

Operation: To raise the doors from open position (as shown at the right in Fig. 1) to closed position the operating levers 4 are caused to rotate the shafts $v$ in the direction indicated by arrow 100, the shafts being at this time at the bottom of the slots $w'$; and the levers bearing against the stops 16 and the shafts $t$ engaging the inclined portion $n$ of the rails on the doors. As the shafts are rotated the chains $v$ are wound thereon and pull upon the recessed ends of the levers, which turning on their fulcrums $s$, raise the doors by means of the shafts $t$ which act upon rails $n$ and $o$ and raise the doors to closed position, the portions $o$ of the rails bearing on the shafts when the doors are closed. During this operation as the outer ends of the levers approach the position shown in Fig. 5, the chains gradually assume an angular position relatively less than right angles with relation to the slots, and the upper walls of the latter thus act as cams to move the shafts to the outer ends of the slots. As the levers approach the position shown in Fig. 4 the continued winding of the chain on the shafts draws the latter back toward the lower ends of the slots, the recessed ends of the levers arriving at a point contiguous to the slots and in position to be engaged by the shafts before the latter are finally drawn to the position shown in Fig. 4, the locking pawls 7 preventing the chains from unwinding from the shafts thus holding the latter in engagement with the ends of the levers. To open the doors the levers 4 are operated to rotate the shafts $v$ in an opposite direction which has the effect of disengaging these shafts from the levers $r$, thus allowing the bearing ends of the latter to fall and the doors to open, the downward movement of the doors being limited by the levers when they are stalled by the stops 16.

What I claim is as follows:—

1. In a dump car having a discharge opening, the combination with a hinged dump door operating mechanism comprising a lever fulcrumed between its ends to a fixed part of the car and having one end adapted to operate and support the door, the portion of the lever between the said end and the fulcrum point of the lever being substantially parallel to the door when in closed position with the fulcrum point nearer the hinge side of the door than the said end, and means for operating the said lever.

2. In a dump car having a discharge opening, the combination with a hinged door, of door operating mechanism comprising a lever fulcrumed between its ends to the car frame adjacent to the door, and adapted to have both arms assume a position substantially parallel to the door when the latter is closed, a member carried by one end of the said lever and engaging the said door, and operating mechanism connected to the opposite end of the lever.

3. In a dump car having a discharge opening, the combination with a hinged door, of a lever for opening and closing such door, such lever being fulcrumed between its ends to the car frame, a member carried by one end of the said lever and supporting the said door, means for operating the lever, and means for locking the lever with the door in closed position, including a member adapted to be wedged between the opposite end of the lever and a part of the car.

4. In a dump car, the combination with a hinged door, of a lever for opening and closing the door such lever being fulcrumed between its ends to the car frame adjacent to the door, means secured to one end of the lever through which it acts upon the door, a laterally movable operating shaft, means operatively connecting the said shaft to the other end of the lever, and means for causing the said shaft to move into engaging position with the last mentioned end of the lever to lock the latter when the door is in closed position.

5. In a dump car, the combination with a hinged door, of a lever for opening and closing the door, such lever being fulcrumed between its ends to the car frame adjacent to the door, a member carried by one end of the lever and supporting the door, a plurality of bearing brackets formed with slots and mounted on the frame of the car, an operating shaft movably supported in the slots, flexible means connecting one end of the lever to the said shaft, and means for operating the shaft, such means being adapted to accompany the shaft in its movement in the slot, substantially as and for the purpose set forth.

6. In a dump car, the combination with a hinged door, of a lever fulcrumed to the car frame adjacent to the door and adapted to operate the latter, operating mechanism connected to the said lever, and a stop independent of said operating mechanism adapted to be engaged by the lever to limit the movement of the doors due to gravity.

7. In a dump car the combination with a central longitudinal discharge hopper having a hinged door, of a pair of levers fulcrumed at their centers; a shaft supported by the ends of such levers and engaging the door; bearings presenting cam slots; an operating shaft mounted in the cam slots; means for rotating the operating shaft and adapted to move with the shaft; and means for limiting the movement of the levers and adapted to relieve the operating shaft of the weight of such doors when open.

8. In a dump car, the combination with a hinged door, of a pair of levers fulcrumed between their ends at points on opposite sides of the door, a shaft carried by corresponding ends of the said levers and having the said door resting thereon, an operating shaft, flexible means operatively connecting the said shaft with the other ends of the levers, and means for operating the said shaft.

9. In a dump car, the combination with a hinged door having inclined rails secured on the under side thereof, of a pair of levers fulcrumed between their ends at points on opposite sides of the door, a shaft carried by corresponding ends of the said levers and having the said rails resting thereon, an operating shaft, flexible means operatively connecting the said shaft with the other ends of the levers, and means for operating the said shaft.

10. In a dump car, the combination with a hinged door having rails secured to the underside thereof, of a pair of levers fulcrumed between their ends at points on opposite sides of the door and each having a recess formed in one end, a shaft carried by the other ends of the said levers and having the said rails resting thereon, an operating shaft, flexible means operatively connecting the recessed ends of the levers with the shaft, means for operating said shaft, and means for causing the shaft to engage the said recesses when the door is in closed position, substantially as and for the purpose set forth.

11. In a dump car, the combination with a hinged door, of a pair of levers fulcrumed between their ends at points on opposite sides of the door, a shaft carried by the ends of the levers and engaging the door, a plurality of bearing brackets formed with inclined cam slots, an operating shaft movably supported in the said slots, means operatively connecting the levers to the shaft, means for rotating the shaft in one direction, and means for locking the said shaft against reverse rotation, including a plate slidably mounted on the car frame, and attached to the shaft to move therewith, a pawl carried by the said plate, and a ratchet wheel rigid on the shaft and adapted to be engaged by the said pawl.

12. In a dump car, the combination with a hinged door, of a lever adapted to operate and lock the said door, and an operating shaft adapted to bear upon the upper face of one end of the lever to lock the said lever against upward movement.

13. In a dump car, the combination with a hinged door, of a lever fulcrumed between its ends and adapted to operate and lock the said door, and an operating shaft adapted to bear upon and lock the said lever.

14. In a dump car, the combination with a hinged door, of a pair of levers fulcrumed between their ends and located at points on opposite sides of and out of the path of movement of the door, a shaft carried by corresponding ends of the levers and having the said door resting thereon, and operating means applied to the opposite ends of the levers to those carrying the shaft.

In testimony whereof, I have signed my name to this specification, in the presence of two subscribing witnesses.

ROBERT MONTAGUE ZIMMERMAN.

Witnesses:
 STANLEY C. KING,
 JOHN A. O'KEEFE.

---

Copies of this patent may be obtained for five cents each, by addressing the "Commissioner of Patents, Washington, D. C."